United States Patent Office 3,193,964
Patented July 13, 1965

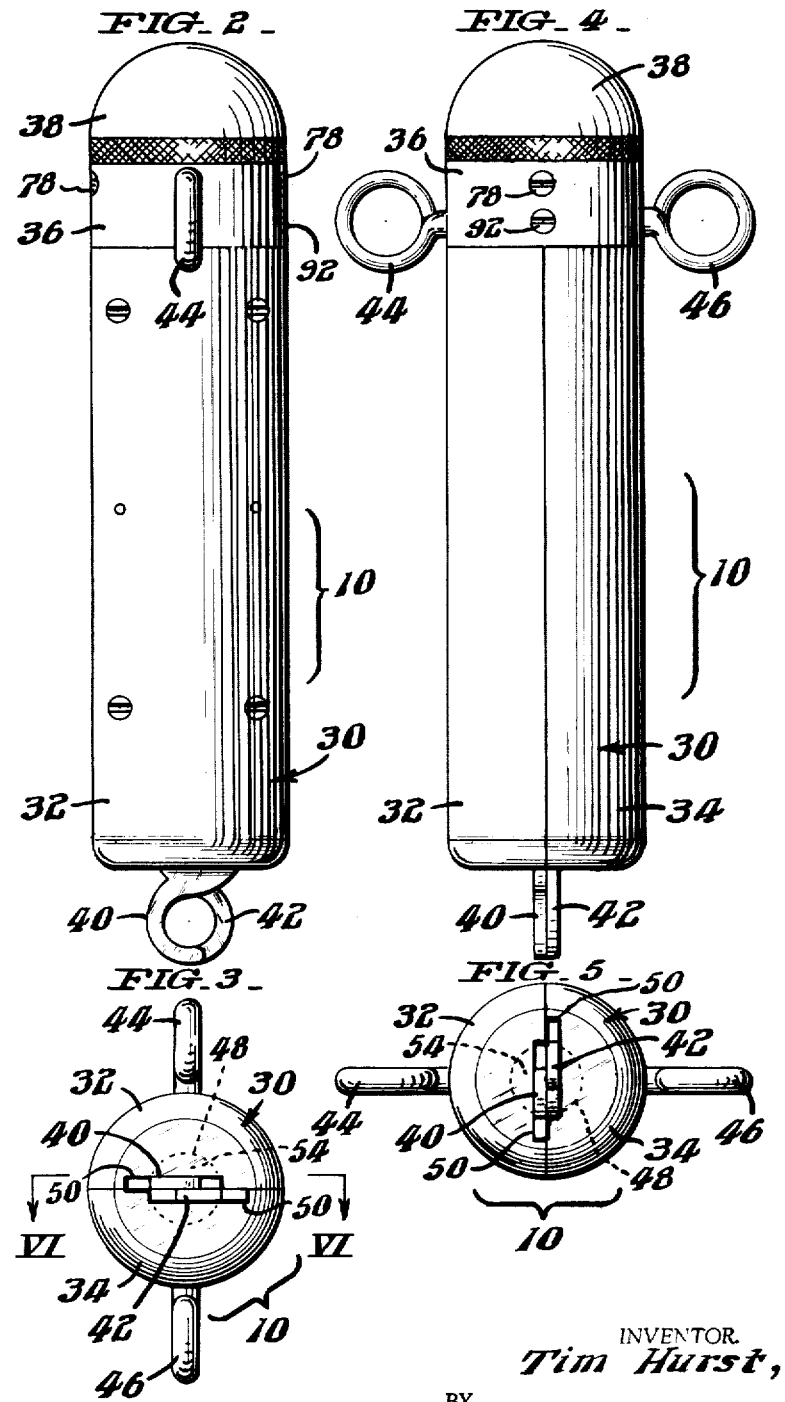

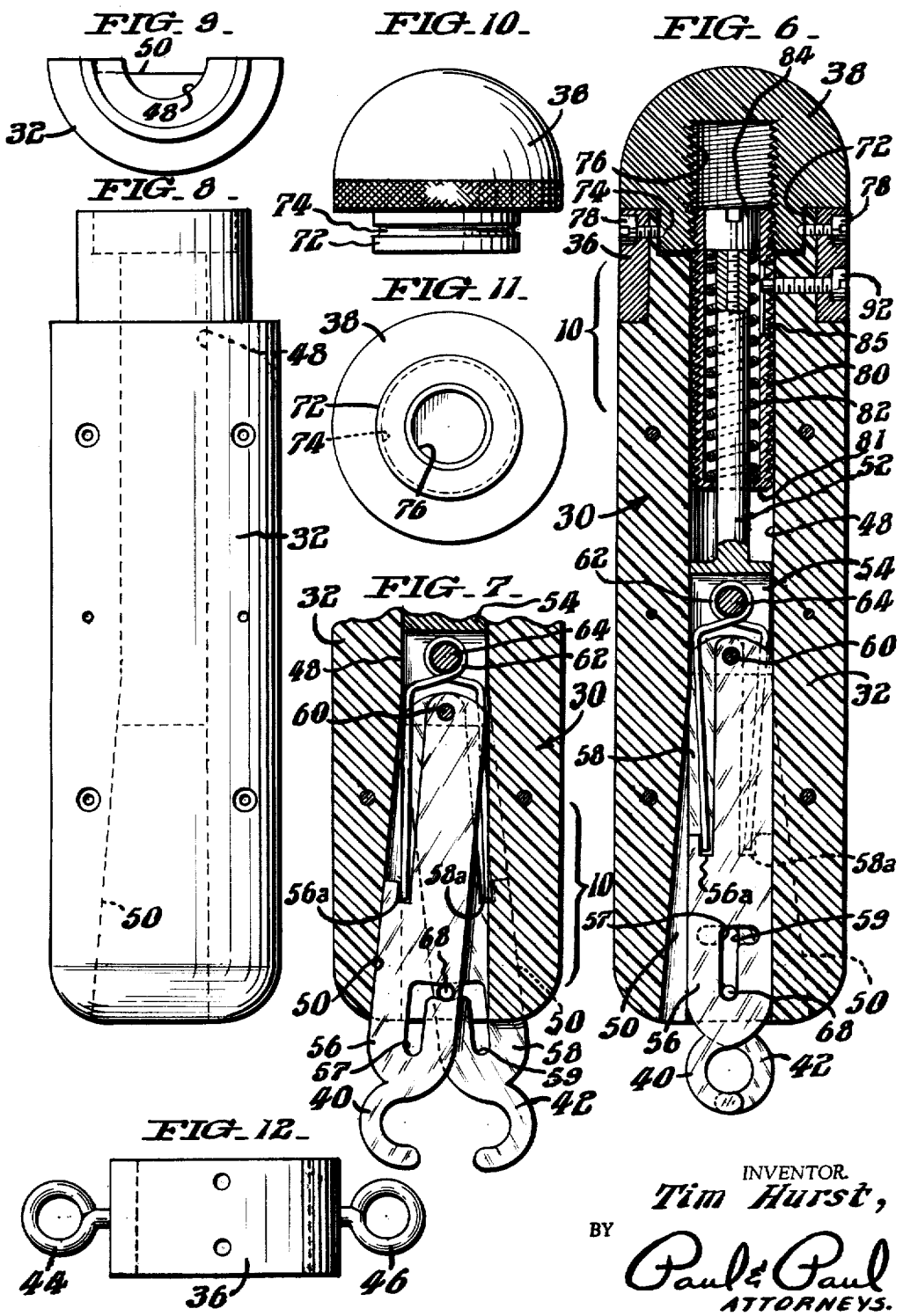

---

3,193,964
OUTRIGGER FISHING LINE GUIDE
Tim Hurst, 1411 Hunting Park Ave., Philadelphia, Pa.
Filed Mar. 9, 1964, Ser. No. 350,216
8 Claims. (Cl. 43—43.12)

This invention relates to an outrigger fishing line guide and, in particular, to an outrigger guide which supports the fishing line while it is positioned during trolling and frees the line when a fish strikes the lure or bait.

The standard outrigger as utilized in modern fishing boats during trolling, employs a clamping device in which the fishing line is held and trailed at a distance to either side of the boat. The clamp prevents the line from being adjusted or moved and only releases the line after a fish strikes. This has disadvantage in that the outrigger clamp must be taken down into the boat every time the trailing position of the line is to be changed.

Further, with the standard outrigger, the outboard fishing line is susceptible to tangling with the inboard lines when the outrigger is being arranged to clamp the outboard line. Various other deficiencies and limitations of the standard outrigger devices are further described below.

Therefore, it is the primary object of this invention to provide an outrigger guide which positions the fishing line out to the side of a moving boat and allows the fisherman to extend or reel in the line after it is in the outboard position.

It is another object of the invention to provide a guide having the above advantages which when subjected to a pull by the fishing line held therein, releases the line and allows the fish to be played directly from the boat.

It is another object of this invention to provide a device having the above advantages wherein means is provided for adjusting the guiding means so that greater or lesser force by the fishing line is required to snap the line free of the guide.

These objects and other attended advantages of this invention will become more apparent from the description set forth hereinbelow and from the attached drawings, wherein:

FIGURE 2 is a side elevational view of the preferred form of the guide of this invention;

FIGURE 3 is a bottom view of the guide as it is shown in FIGURE 2;

FIGURE 4 is a side elevational view of the guide turned ninety degrees from that shown in FIGURE 2;

FIGURE 5 is a bottom view of the guide of FIGURE 4;

FIGURE 6 is a sectional view taken along the lines and arrows VI—VI of FIGURE 3;

FIGURE 7 is a partial view similar to that of FIGURE 6;

FIGURE 8 is a partial side elevational view of a body member;

FIGURE 9 is a top view of the member shown in FIGURE 8;

FIGURE 10 is a side elevational view of the cap;

FIGURE 11 is a bottom view of the cap; and

FIGURE 12 is a side elevational view of the retaining collar.

Figure 1:
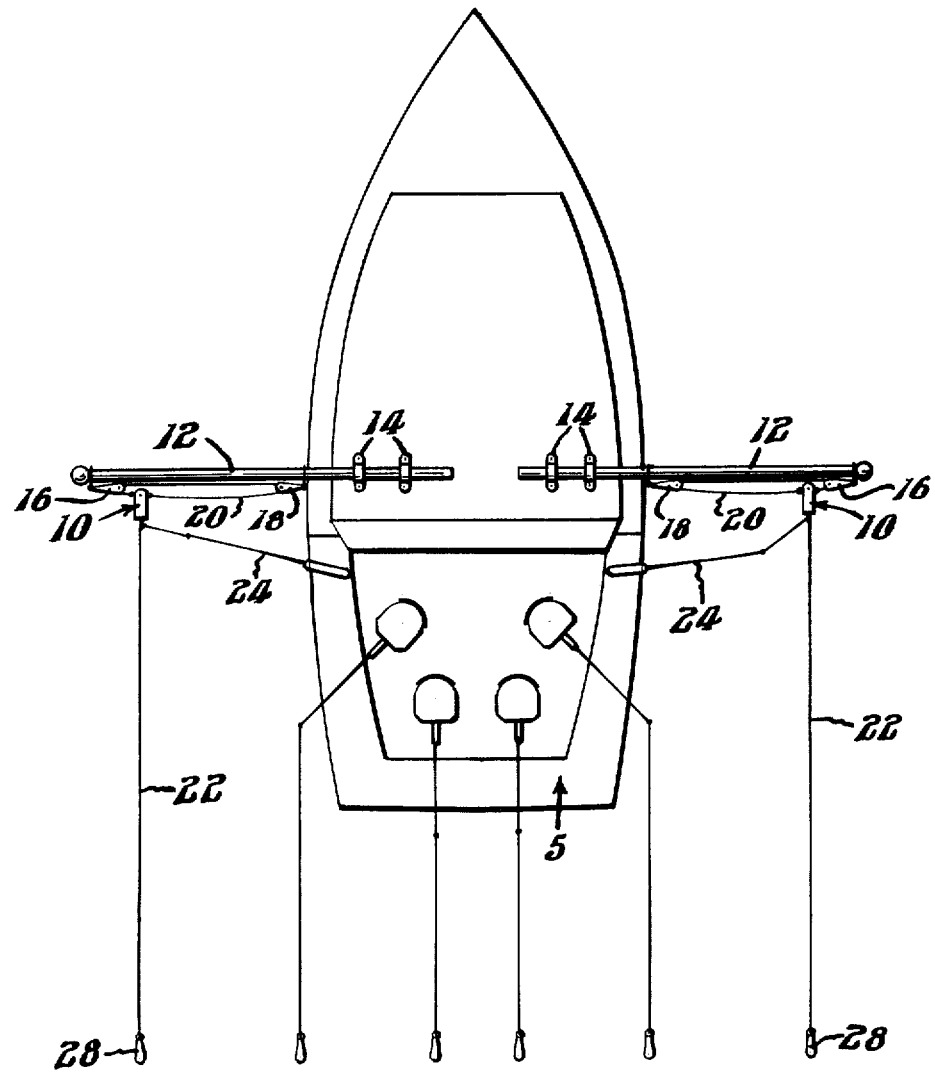
FIGURE 1 is a diagrammatic top view of a typical fishing boat equipped with outriggers.

Referring preliminarily to FIGURE 1 of the drawings, a preferred form of the outrigger guide of this invention is identified generally by the numeral 10.

FIGURE 1 further illustrates a standard fishing boat 5 moving through the water and trolling for fish in the well-known manner.

Extending from both the starboard and port sides of the boat are outrigger supports 12 detachably mounted on the boat in brackets 14. Each outrigger carries a pair of sheaves 16, 18 through which halyard 20 is looped. The guide 10 is detachably fastened to the halyard 20 by a pair of snap hooks (not shown), permanently attached to the line. Thus, the guide 10 may be conveniently moved from a position close to the boat to a distant lateral position as shown so that the fishing line 22 extending from fishing rod 24 trails at a safe lateral position from the remaining fishing lines 26. The bait or lure 28 is of sufficient weight to carry the line to any desired distance behind the boat as explained hereinbelow.

Referring now to FIGURES 2 through 5 of the drawings, a preferred form of the outrigger guide of this invention is shown in greater detail. The cylindercial shaped guide 10 comprises a body portion 30 composed of two identical semi-spherical body positions 32, 34, a collar 36, cap nut 38 and a pair of hooks 40, 42 forming a split ring in which is positioned the fishing line. A pair of screw eyes 44, 46 are threaded into collar 36 and provide means to attach the guide 10 to the halyard 20.

Referring now to FIGURES 6, 8 and 9 of the drawings, each body portion 32, 34 of the guide is provided with an axial bore 48 having a tapered open end portion 50 in which is located a piston 54 having a stem 52 extending toward the closed end of the guide 10. Piston 54 is shaped for longitudinal movement within bore 48.

Inserted in a slot in piston 54 are two leaves 56, 58 (FIGURE 7) held by a pin 60 mounted in piston 54. The leaves 56, 58 have at their distal ends curved hooks 40, 42 which define a closed loop or split ring when positioned as shown in FIGURE 6 and are open as shown in FIGURE 7. A torsion spring 62 is attached to piston 54 by a second pin 64 at its looped end and spring 62 has distal ends located in slots 56a, 58a milled into the sides of leaves 56, 58, thereby continually urging the leaves apart.

L-shaped slots 57, 59 are milled through leaves 56, 58 respectively, and said slots move around a stationary pin 68 held in guide body 10. The length and shape of slots 57, 59 controls the amount of travel, both longitudinal and radially, of leaves 56, 58.

In FIGURES 10 and 11, a cap nut 38 preferably made of a non-corrosive metal such as brass, is shown having a portion 72 of reduced diameter in which a groove 74 is located. As shown in sectional view in FIGURE 6, cap 38 is provide with an internally threaded bore 76 in which a threaded spring retainer 80 is held. Cap 38 is attached to body members 32, 34 by a pair of screws 78 which thread through collar 36 and ride in groove 74, thereby allowing rotary movement of cap 70 but securing the cap to the body 30.

A retaining collar 36 also shown in FIGURE 12, preferably made of a non-corrosive metal such as brass, holds cap 38 to the body 30 by means of screw 92. Collar 36 also acts as a smooth thrust bearing for cap 38 as explained hereinbelow.

Within spring retainer 80, as shown in FIGURE 6, is mounted a helical compression spring 82 which is held captive between bolt head 84 attached to piston stem 52 and the base 81 of retainer 80. A slot 85 is milled in threaded spring retainer 80 to accommodate dogpoint screw 92 thereby preventing spring retainer 80 from rotating when cap nut 38 is turned.

As piston 54, piston stem 52 and leaves 56, 58 are mounted for axial movement in bore 48, when knurled cap nut 38 is turned in a clockwise direction, it draws threaded spring retainer 80 in an axial direction into threaded bore 76. As compression spring 82 subsequently exerts greater pressure on bolt 84, piston 54 is pulled lengthwise in the bore. As the two leaves 56, 58 held by pin 60 are mounted in a tapered portion 50, the leaves are drawn together against the urging of spring 62 and move toward the closed end of the guide 10. Consequently, the hooks 40, 42 are closed.

Slots 57, 59 and pin 68 facilitate and control radial movement of leaves 56, 58 by defining the direction of movement of leaves at each longitudinal position of the leaves. When the pin is located in the base portion of the L-shaped slots 57, 59 as shown in FIGURE 7, leaves 56, 58 cannot be moved axially in either direction until the leaves and longitudinal sides of the slots are superimposed or positioned as shown in FIGURE 6. At this position, leaves 56, 58 are free to move axially upon the urging of spring 82.

As shown in FIGURE 7, the hooks 40, 42 attached to the distal ends of leaves 56, 58, respectively, are open, due to the urging of spring 62, the leaves 56, 58 having been pulled longitudinally against the force of spring 82 until pin 68 is located as shown. The leaves are prevented from further movement out of body 30 by pin 68.

Torsion spring 62 continues to hold the leaves and hooks apart so that a fishing line may be inserted between the hooks at leisure.

When the two hooks 40, 42 are squeezed together, after the insertion of the line 22, the slots 57, 59 move into alignment and move axially around stationary pin 68 while the leaves are drawn into the body 30 by spring 28, thereby closing hooks 40, 42 and forming a guide ring for the line as shown in FIGURE 6.

The operation of the outrigger fishing line guide of this invention is substantially as follows:

The fishing line 22 is inserted between the open hooks 40, 42 when the guide is drawn close to the boat by the halyard 20.

The hooks 40, 42 are then manually squeezed together so that spring 82 acts to draw leaves 56, 58 into the tapered bore 48, thereby allowing slots 57, 59 to move up pin 68 and close the hooks forming a complete circle. Then the guide 10 is swung away from the side of the boat by pulling halyard 20 to the desired distance when a relatively short length of fishing line is hanging from the guide above the water. At this time, the fishing line is allowed to run through the closed hooks until the lure assumes a suitable position behind the boat. At any subsequent time, the line can be reeled in to inspect the lure or bait, or when the boat makes a change in direction.

When a fish strikes the lure and takes the hook, the line is snapped out of guide 10 by pulling the hooks and are radially spread by spring 62. The hooks 40, 42 will leaves axially against spring 82 at which time the hooks remain open until pressed together by thumb and finger, when they will automatically snap back into the body member into the position shown in FIGURE 1. The fish is played by the fisherman from his rod in the boat.

The materials used to form the guide of this invention will, preferably, be resistant to salt water corrosion and, for example, the body of the guide can be formed of plastic while the collar, leaves and hooks may be formed of brass.

It will be realized from the above description, that it is one of the main advantages of this invention that a fishing line held by the guide does not become entangled with lines of other fishermen in the boat and in the water close by as the line is already a distance from the side of the boat before it is allowed to run.

In addition, should the captain of the boat desire to turn the boat around to recross a certain spot where there is a school of fish, the line may be quickly reeled in and left suspended from the end of the outrigger until the boat turn is completed and then played out again. Or, should the angler wish, he may reel in his line to ascertain if his line is intact or to see if there is any foreign substance such as marine weeds on his line, bait or lure without difficulty.

With some species of fish, it is better to have the bait or lure skip along the surface of the water, while with others, it is best to fish below the surface. When fishing through a school of fish, it is sometimes preferable to fish deep as the smaller fish are near the surface and the larger ones are further below the surface. With the guide of this invention, means is provided for simple adjustment of tension in which the line is held. By adjusting the spring retainer, a plainer can be added or heavy weights or sinkers placed on the line to carry it down to greater depth without snapping the line free until a fish actually hits the bait.

As the drag on nearly all reels is adjustable, greater tension can be put on the reel than is required to snap the line free from the line guide. After the line is snapped from the guide, and prior to the time the reel exerts tension, the fish can swallow the bait. This allows the hook to be fully taken by the fish and thus betters the fisherman's chance of landing fish.

Another advantage of the snap free line guide of this invention is that by having the fishing line run free in the guide, still fishing or bottom fishing with the desired depth can be practiced by the fisherman. The guide can also be used as a clamping device by putting a double loop through the guide ring so that the line will not run but will open the split ring as easily as a single line.

Although this invention has been disclosed with reference to specific forms and embodiments thereof, it will be appreciated that a great number of variations may be made without departing from the spirit or scope of this invention. For example, parts may be reversed, equivalent elements may be substituted for those specifically disclosed, and certain features of the invention may be used independently of other features, all without departing from the spirit and scope of this invention as defined in the appended claims.

Having described my invention, I claim:

1. An outrigger fishing guide designed to release the fishing line when a predetermined tension is placed on the line, said guide comprising
   a body member and cap mounted on one end of the member for independent rotary movement thereon, said body member having a bore therein and tapered slots extending from the bore to the distal end of said member,
   a pair of hook members mounted for axial and partial radial movement in the bore and slots for movement to open and closed positions and having opposingly curved hooks located outside the distal end of the body member, said hooks supporting the fishing line therebetween when in the closed position,
   means uring the hooks apart to an open position when the hook members are pulled axially toward the distal end of the body member to free the line, and
   spring biased means mounted in the bore of the body member, said means being connected to the hook members at one end and threadedly engage in the cap to continually urge the hook members axially into the body members to maintain the hooks in closed position whereby upon rotating the cap relative the body member the tension on the hook members is selectively controlled.

2. The guide as defined in claim 1 further including support means mounted on the surface of the body member whereby the guide is suspended over the water.

3. The guide as defined in claim 1 wherein the spring biased means comprises
   a piston mounted for axial movement in the bore of the body member and attached to the hook members,
   a spring retainer mounted in the bore of the body member and threadedly engaged with the cap, and
   a compression spring mounted between the piston and spring retainer so as to continually urge the piston toward the cap whereby upon rotating the cap relative the body member the spring retainer is displaced axially thereby selectively varying the tension required to displace the piston and hook members against the spring toward the distal end of the body member.

4. The guide as defined in claim 3 further including means for holding the hook members together with the hooks forming a closed circle when the members are pulled axially into the body member by the piston spring.

5. An outrigger fishing guide for supporting a fishing line until tension of a desired level of magnitude causes the release of the line, said guide comprising;

a generally cylindrical body member having external support means, and a cap mounted on one end of said member for independent rotary movement thereon, said body member having an axial bore extending inwardly a certain distance from the cap end and a pair of axially directed, outwardly tapering slots extending from the bore to the distal end of the body member, said cap having a threaded bore, a piston mounted in the bore of the body member for limited axial movement in the direction of the distal end of the body member against the tension of a piston spring, a pair of hook members partially superimposed on one another and pivotally attached to one end of the piston within the bore, said hook members extending through the tapered slots and having opposingly curved hooks located outside at the distal end of the body member to support a fishing line therebetween, means for holding the hook members together with the hooks forming a closed circle when the members are drawn inwardly in the body members in response to the tension on the piston spring and means urging the hooks apart to free the fishing line when the hook members are moved axially toward the distal end of the body member against the tension of the piston spring in response to tension on the fishing line, and a piston spring retainer mounted within the bore of the body member concentric to the piston having threads formed on the external surface, said threads being engaged with the threads in the cap bore so that rotation of the cap causes the spring retainer to move axially thereby varying the spring tension on the piston and on the hooks members.

6. The guide as defined in claim 5 wherein said means for holding the hook members together includes an L-shaped slot provided in each hook member and defining a passageway for a stationary stud mounted within the body member adjacent the distal end and projecting through the slots in said members, said slots being positioned in each member so that when the hook members are completely superimposed on one another, the members move axially in response to the piston spring with the long legs of the slots passing around the stud and when the hook members are pulled against the piston spring toward the distal end of the body member, the hook members move radially when the short legs of the slots pass around the stud.

7. The guide as defined in claim 6 wherein;

the cap is provided with an annular flange having an annular groove formed therein and the body member is provided with a recess similar in size to the cap flange, a threaded stud being mounted in the body member and protruding into the groove of the cap whereby the cap may be rotated while mounted on the body member.

8. The guide as defined in claim 7 wherein said means urging the hooks apart includes a torsion spring mounted on the piston with distal ends attached to the hook members so as to continually urge said members in opposing radial directions.

References Cited by the Examiner

UNITED STATES PATENTS

| 1,280,533 | 10/18 | Pegler | 81—112 |
| 1,340,105 | 5/20 | Bettger | 280—453 |
| 1,927,528 | 9/33 | Nilsson | 81—112 |
| 2,715,012 | 8/55 | Huber. | |

FOREIGN PATENTS 687,010   2/53   Great Britain.

SAMUEL KOREN, *Primary Examiner.*

ABRAHAM G. STONE, *Examiner.*